United States Patent [19]

Joniec

[11] Patent Number: 4,629,196
[45] Date of Patent: Dec. 16, 1986

[54] COUPLER AND MANIFOLD ASSEMBLY WITH DIFFERENTIAL VACUUM SEAL MEANS

[75] Inventor: George W. Joniec, Lambertville, Mich.

[73] Assignee: Process Alternatives & Combustion, Inc., Lambertville, Mich.

[21] Appl. No.: 755,458

[22] Filed: Jul. 16, 1985

[51] Int. Cl.⁴ .......................... F16J 15/34; F16J 15/48
[52] U.S. Cl. .......................................... 277/3; 277/15; 277/17; 277/81 R
[58] Field of Search .............................. 277/3, 15–19, 277/21, 22, 28, 81 R

[56] References Cited

U.S. PATENT DOCUMENTS

| | | | |
|---|---|---|---|
| 2,085,777 | 7/1937 | Williams | 277/3 |
| 2,710,205 | 6/1955 | Brkich | 277/3 |
| 3,334,905 | 8/1967 | Horwitz et al. | 277/3 |
| 3,360,272 | 12/1967 | Blom et al. | 277/3 |
| 4,014,555 | 3/1977 | Jacottet | 277/15 X |
| 4,290,609 | 9/1981 | Dumont | 277/3 |

*Primary Examiner*—Robert S. Ward
*Attorney, Agent, or Firm*—Robert E. Witt

[57] ABSTRACT

A coupler and manifold assembly which makes it possible to turn the shaft and impellers of an absorption chiller circulating pump with an external drive means instead of a hermatically sealed drive means, comprising an interconnecting combination of a plurality of restrictive orifices, a plurality of solenoids, conduit, and a plurality of chambers to help provide a differential vacuum across a seal face of a double mechanical rotating seal, to substantially prevent the introduction of air into the vacuum of the essentially closed system of an absorption chiller, during operation and/or shut down of the absorption chiller.

15 Claims, 7 Drawing Figures

COUPLER AND MANIFOLD ASSEMBLY WITH DIFFERENTIAL VACUUM SEAL MEANS

BACKGROUND OF THE INVENTION

This invention relates to a device which enables an external drive means to be employed to activate a circulating pump of an absorption chiller, without substantial loss of operating vacuum, even during shut down of the chiller.

More specifically, this invention relates to a coupler and manifold assembly for use between an external drive means and a circulating pump of an absorption chiller, which coupler and manifold assembly is capable of maintaining a vacuum or series of vacuums under operating and static conditions, while circulating a fluid, usually water, in a closed system, for cooling and lubricating the pump as the pump is circulating a refrigerant, such as lithium bromide, through another closed system, under vacuum, in an absorption chiller.

Heretofore, it has been the practice in the industry to employ a hermetically sealed "wet rotor" designed drive means to activate the circulating pump, comprising a specially designed water cooled electric motor, whereby the cooling and lubricating water passes through the gap between the rotor and stator of the motor. There are problem, however, with the use of hermetically sealed drive means, including an unpredictable operating life, due to a variety of particulate contaminants in the water, including welding slag, corrosion products and dirt, which particles abrade the thin stainless steel liner that separates the water from the stator windings. Additionally, the hermetically sealed drive means are not rebuildable, thus constituting a very expensive operational cost.

During operation, the rotor of the hermetically sealed drive means is spinning at approximately 1500-2000 RPMs, and cooling water is passed through the gap between the rotor and the stator at approximately 2 gallons per minute. Thereby, erosion of this liner also occurs due to the high velocity of the water as it passes through the thin space between the stator and the spinning rotor.

Mechanical stress is a third cause of failures of hermatically sealed drive means, especially during start-up when the pressure of the water in the drive means can very from as low as 7 mm of Hg absolute to 5 psi. This stress reversal fatigues the thin stainless steel liner and causes cracks which allow air to pass from the stator into the drive means. Upon failure, and passage of air into the drive means, the necessary vacuums for operating the absorption chiller are thus deteriorated and the efficiency of the system diminishes.

Up to the present time, the only solution for correcting the above problems, is to replace the hermatically sealed drive means at a great expense and without any guarantee for longevity of its repalcement, since the latter also has a small space between the stator and the rotor and the system is still circulating fluid with particulate contaminants therein.

SUMMARY OF THE INVENTION

The present invention, however, provides a coupler and manifold assembly to enable employment of an external drive means. This coupler and manifold assembly is designed to eliminate the above problems by employing external drive means, and is designed to withstand the inherent destructive forces of particulate contaminants circulating within the system, by utilizing a thick, sturdy housing for the coupler unit and by utilizing relatively large tolerances to minimize the effects of the contaminants circulating in there through.

The coupler, fabricated from a heavy duty sturdy metallic cast housing, is capable of holding a vacuum, and is capable of supporting a shaft to connect to an external drive means on one end and to a circulating pump for an absorption chiller on the other end.

By design, the coupler and manifold assembly accommodates in combination a plurality of vacuum chambers, a plurality of restrictive orifices, a plurality of solenoid values, at least one carbon bearing to support the shaft within the coupler housing and at least one commercially available high precision double mechanical rotating seal.

The double mechanical rotating seal normally cannot be used at the vacuums required to operate an absorption chiller, but when it is used in combination with the above described elements, it maintains desired vacuums within the seal and within the plurality of chambers in the housing. This is accomplished by "splitting" the vacuum over both seal faces of the double mechanical rotating seal, via the use of the restrictive orifices which cause restricted flow to one chamber and a back pressure upon the chamber within the double mechanical rotating seal.

Solenoids valves are strategically positioned in the conduit of the manifold assembly, and these solenoid valves are in electrical communication with the circulating pump. So that upon shut down of the absorption chiller, the solenoid valves are activated to close, to secure the vacuum in the various chambers.

The carbon bearing mounted within an opening of an interior wall of the coupler housing, serves to support the shaft of the coupler and to provide communication between chambers divided by the interior wall.

One advantage then of the present invention is that an external drive means is employed to activate the shaft and attached impellars of the circulating pump, thereby eliminating the heretofore described problems of abrasion due to the particulate contaminants and erosion due to the high velocity of the water as it passes between the stator and the spinning rotor of the hermatically sealed drive means. Another advantage of the present invention is that the sturdy housing of the coupler and the relatively larger tolerances employed therein, withstand the inherent destructive forces of circulating particulate matter and the coupler is repairable. Another advantage of the present invention is that by employing an external drive means with the coupler and manifold assembly, any heat given off by the external drive assembly is not rejected or transferred to the chiller, as is the situation when a hermatically sealed drive means is employed, and thereby the useful output of the chiller is increased. Yet another advantage of the present invention is that by employing external drive means, variable speed drive means may also be used, to optimize part-load operation of the chiller and thereby extend the capacity of the chiller.

The present invention has proven to be well suited to longevity of operation, to be reliable by maintaining the required vacuums under operating and static conditions, and to be economical by being repairable.

It is therefore an object of the present invention to provide an external drive means to power the circulating pump of an absorption chiller via a coupler and manifold assembly capable of maintaining desired vacuums during operating and static conditions, and to eliminate use of hermatically sealed drive means.

It is another object of the present invention to provide a coupler and manifold assembly, comprising a sturdy housing and relatively large tolerances to eliminate normally occurring destructive forces of abrasion and erosion due to particulate contaminants circulating within the fluid and to eliminate mechanical stress due to stress fatigue during start-up of the drive means.

It is yet another object of the present invention to eliminate heat generated by the drive means from transferring to the absorption chiller, thereby increasing the efficiency of the absorption chiller.

It is still another object of the present invention to provide a coupler and manifold assembly which is reliable and economical to operate over a long duration, and which is repairable.

This invention makes possible the use of commercially available high precision double mechanical rotating seals in an environment normally far in excess of their specifications by "splitting" the vacuum across both seal faces. One of such seals comercially available is described in U.S. Pat. No. 3,972,536.

According to the present invention, the coupler and manifold assembly is employed to allow use of external drive means to power the pump shaft of an absorption chiller, while maintaining the required vacuum within the absorption chiller, during operating and static conditions.

One essential feature of the present invention is the use of a plurality of restrictive orifices of sufficient diameter to produce the desired vacuums within the plurality of chambers, whereby the restrictive orifices have a combined diameter to allow sufficient flow of fluid, normally water, to maintain the needs of said bearing and circulating pump under operating conditions.

Another essential feature of the present invention is the use of a plurality of solenoid valves, which are in electrical communication with the circulating pump, so that when the absorption chiller is shut down the solenoid valves are activated to close, thereby ensuring the maintenance of the vacuums within the chambers. Any tendency of atmospheric air entering the system through the one seal face, which is sealing against the entry of atmospheric air, is assisted by the fluid within the vacuum chamber provided by the double mechanical rotating seal, since the fluid, normally water, is more viscous than the air, and thus restrains the latter from entering the vacuum chamber provided by the double mechanical seals.

DETAILED DESCRIPTION OF THE PREFERRED EMOBDIMENT

The coupler and manifold assembly of this invention find particular utility in the operation of an absorption chiller, which requires the presence of a vacuum in order for its circulating brine solution, usually lithium bromide, to property serve as a refrigerant during heat transfer within the absorption chiller.

Specifically, the coupler and manifold assembly of this invention find utility in the circulation of a cooling and lubricating fluid, usually water, and in maintaining vacuums necessary in the efficient operation of an absorption chiller, by enabling an external drive means to be employed to drive the circulating pump of the absorption chiller.

In the construction of the coupler and manifold assembly, it is important that the vacuum and fluid within the chambers, be maintained under operating and static conditions. At the same time, one or more high precision double mechanical rotating seal, such as is disclosed in U.S. Pat. No. 3,972,536, employed as one or more of the chambers, must be capable of maintaining a vacuum and a fluid seal under conditions normally in excess of its specifications. These requirements indicate the necessity for providing an environment suitable to meet the specifications of the double mechanical rotating seal, by "splitting" the vacuum, normally in excess of the seal specifications, over both seal faces. Therefore, it becomes crucial that the coupler and manifold assembly provide such environment for the double mechanical rotating seal to function, despite the fact that operating vacuums within the chiller will be in excess of the specifications of the double mechanical rotating seal.

Figure 1:
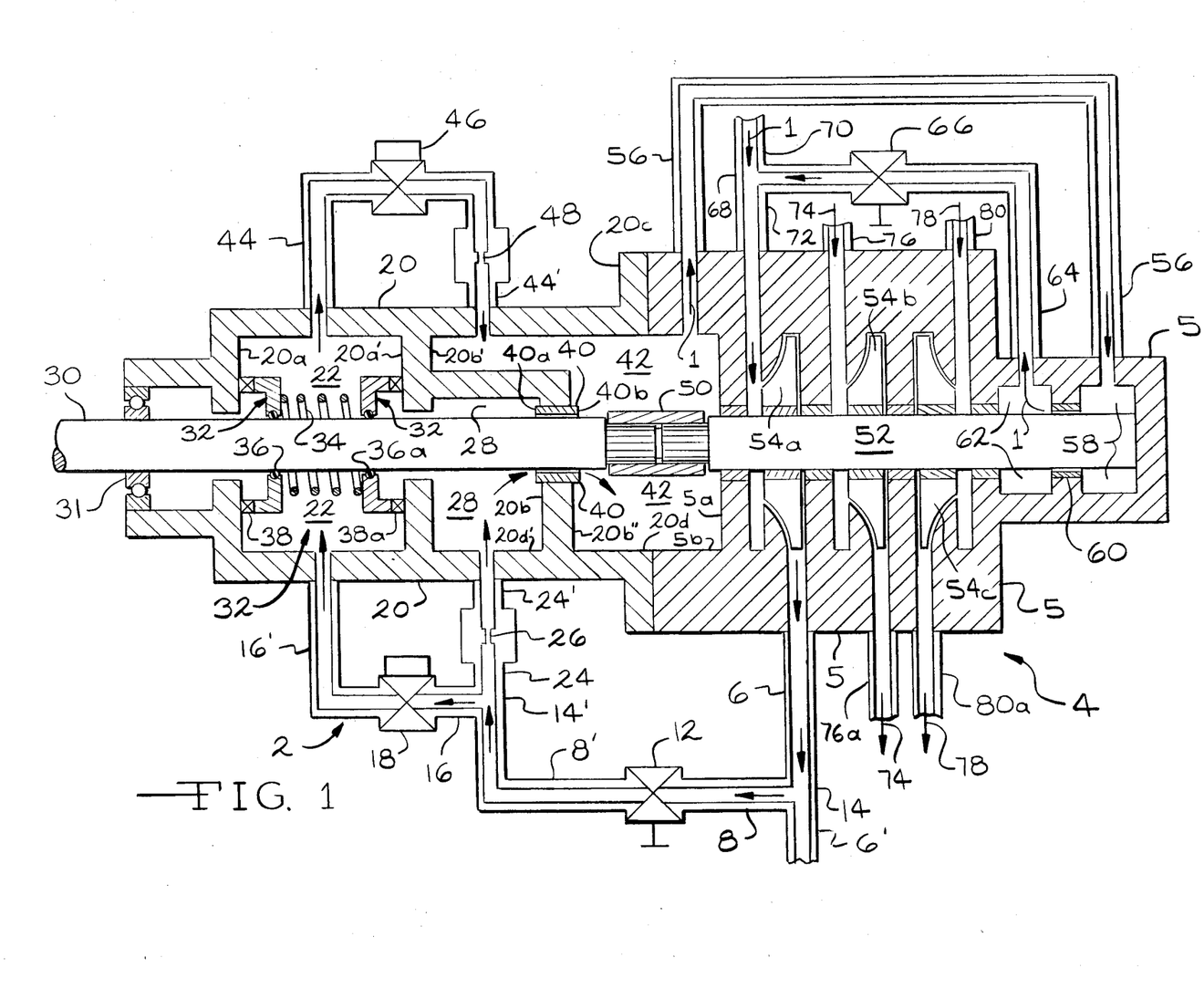
FIG. 1 is a schematic view of the invention, with the coupler attached to a circulation pump for an absorption chiller.

Referring to FIG. 1, the coupler and manifold assembly 2 are shown in a connected relationship to the circulating pump 4 of an absorption chiller (not shown) via mounting flange 20c of coupler housing 20 justaposed onto pump housing 5.

Fluid 1, usually water, is discharged by pump 4 when the absorption chiller is operating, through conduit 6 on the discharge side of pump 4. The fluid 1 is circulated to a tee 14 which diverts a portion thereof through conduit 6' to the absorption chiller and another portion thereof through conduit 8 to the coupler and manifold assembly 2. A hand valve 12 is affixed to conduit 8 for controlling the flow of fluid 1 and for locking fluid within the system, when desired. Conduit 8', leading from hand valve 12 represents the initial part of the manifold assembly in association with the coupler, which enables an external drive means (not shown) to be employed. The fluid 1 is circulated to tee 14' where a portion is diverted through conduit 16 and another portion is diverted through conduit 24. The flow of fluid 1 through conduit 16 and conduit 16' is unrestricted thus causing a larger portion thereof to enter coupler housing 20 and to enter chamber 22 which is capable of maintaining a vacuum and of retaining fluid 1 under operating and static conditions. Chamber 22 is diagramatically represented in FIG. 1 for a clearer understanding, but in reality it is contained within the double mechanical rotating seal 32, also represented diagramatically in FIG. 1 for a clearer understanding. The flow of fluid 1 through conduit 24 is impeded by an in-line restrictive orifice 26, thus causing a smaller portion of fluid 1 to pass through the coupler housing 20 via conduit 24' and to enter chamber 28, which is capable of maintaining a vacuum and of controllably releasing the fluid 1 to an adjacent chamber 42. The fluid 1 which has entered chamber 22 exits coupler housing 20 via conduit 44, where its flow is impeded by another restrictive orifice 48, which causes a back pressure within chamber 22. The fluid 1 then passes through coupler housing 20 through conduit 44' and enters into chamber 42.

Coupler shaft 30 passes through the center line of coupler housing 20. Shaft 30, which communicates on its one end with the external drive means (not shown), is supported by a thrust bearing 31, affixed to coupler housing 20. Shaft 30 passes through an opening in an interior wall 20b of coupler housing 20, which opening is mounted with a carbon bearing 40, to help support shaft 30 on its other end which communicates with pump shaft 52 via a splined coupling 50. The fluid 1 in chamber 28 passes through bearing 40 into chamber 42, during operation of the absorption chiller. The bearing 40 also serves as a restrictive orifice to cause a back pressure in chamber 28 and to restrict flow of fluid 1 into chamber 42.

In order to maintain sufficient vacuums within the coupler and manifold assembly 2, to enable the use of an external drive means, a high precision double mechanical rotating seal 32 is employed, to serve as a vacuum and fluid chamber.

Referring again to FIG. 1, a diagramatic double mechanical rotating seal 32 is shown in a fixed engagement with shaft 30 via static seals 36, O-rings, on the atmospheric side, and 36a on the vacuum side, and is further shown in a rotating engagement with interior walls 20a, and 20a' of coupler housing 20, via rotating seal 30 on the atmospheric side and via rotating seal 38a on the vacuum side respectively, and spring 34 is shown biasing the diagramatic double mechanical rotating seal 32 into frictional engagement with walls 20a and 20a'.

The vacuum in chamber 22 is of substantially less magnitude than the vacuum in chambers 28 and 42, the latter of which are substantially equal and of substantially the same magnitude as the vacuum in the absorption chiller. Chamber 22, in actuality, is defined within a working embodiment of a double mechanical rotating seal. Chamber 28 is substantially defined by available room, less the volume of shaft 30, between walls 20b, 20b', and 20d'' walls of coupler housing 20, a mounting flange (not shown with the diagramatic double mechanical rotating seal 32) and surface 40a of bearing 40. Chamber 42 is substantially defined by available room, less the volume of shaft 30 and splined coupling 50, between walls 20b', 20b'', 20d of coupler housing 20, surface 40b of bearing 40, and by a cavity provided by walls 5a and 5b of circulating pump housing 5, when the housings are joined.

The fluid 1, exits chamber 42 via the pump housing 5, through conduit 56, and reenters the pump housing 5 into a first pump chamber 58, where it subsequently passes through a carbon bearing 60 into a second pump chamber 62. The fluid 1 then exits the pump housing 5, via conduit 64, equipped with hand valve 66, and enters tee 68, where it is joined by additional fluid 1 coming from the absorption chiller (not shown) on the suction side of pump 4, via conduit 70, which had previously been discharged to the absorption chiller on the discharge side of the pump, thus completing a closed system for the fluid 1, via conduit 72 leading back into the suction side of the pump housing 5.

When the circulating pump 4 is activated via an external drive means (not shown) impellars 52a, 54b and 54c, attached to pump shaft 52 rotate, which creates a suction on one side of the circulating pump 4 and a discharge on the other side of the circulating pump 4, thereby circulating fluid 1 through one closed system and brine solutions of different concentrations through additional closed systems throughout the absorption chiller. Hand valves 12 and 66 on the discharge side and on the suction side of the circulating pump 4 respectively, are used to prevent the fluid 1 from venting from the closed system upon shut down and static conditions.

Solenoid valves 18 and 46, positioned on conduit 16 leading to chamber 22 and on conduit 44 leading from chamber 22, are in electrical communication with the external drive means, whereby upon shut down and under static conditions, the solenoid valves 18 and 46 are actuated to close, to secure the vacuum and the fluid within chambers 28 and 42. Any seal leakage of atmospheric air into chamber 22 is substantially minimized or eliminated due to differential vacuums being provided in chambers 22 and 28, i.e., the vacuum is "split" between chamber 28 and atmospheric pressure. And, seal leakage is further minimized due to the fluid 1 having a viscosity greater than that of air, thus offering resistance to the passage of air across seal face 38. Likewise, at the other seal face 38a, the vacuum of lower magnitude in chamber 22 substantially minimizes or eliminates leakage into the vacuum of higher magnitude in chamber 28.

Impellars 54b and 54c attached to pump shaft 52, circulate brine solutions 74 and 78, usually of different concentrations, within the absorption chiller, which brine solutions 74 and 78 are shown entering the suction side of pump housing 5 via conduits 76 and 80 respectively, and exiting on the discharge side of pump housing 5 via conduits 76a and 80a respectively, for return to the absorption chiller.

The circulating pump 4 is thereby designed to supply different pressures and different concentrations of the brine solution to different areas within the absorption chiller where heat transfer occurs, while at the same time being designed to circulate an innocuous fluid, such as water, for lubrication and cooling of the circulating pump 4. The vacuums must be maintained within the absorption chiller for various chemical and physical reactions to occur, including the vaporization of water by boiling, and the absorption of water vapor by the brine solution. Typically, in a vacuum of 29.72" of Hg, boiling occurs at 38 degrees Fahrenheit, whereas if air enters the system and reduces the magnitude of the vacuum, to say 28" of Hg, the boiling point temperature rises, to approximately 45 to 50 degrees Fahrenheit, and the chilled water temperature increases, and thereby the system is not efficient and is unacceptable for air conditioning.

Figures 2, 3:
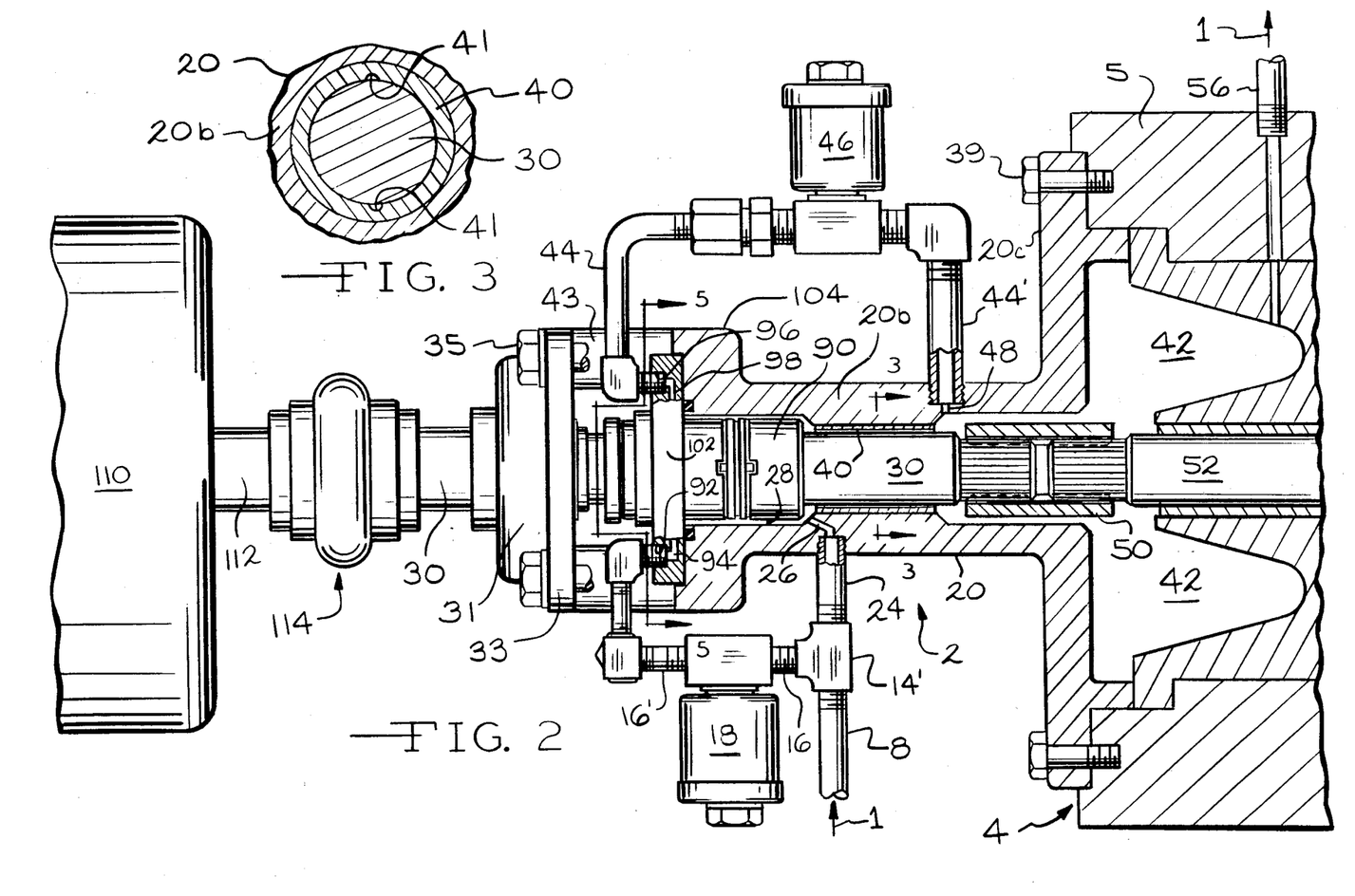
FIG. 2 is a partial sectional view along the center-line of a working embodiment of the invention.
FIG. 3 is a sectional view along line 3—3 in FIG. 2.

Referring to FIG. 2, coupler housing 20 at the pump side thereof, is shown secured to circulating pump housing 5 via mounting bolts 39 passing through mounting flange 20c of coupler housing 20 and circulating pump housing 5, and coupler housing 20 at the drive side thereof, is shown with thrust bearing 31 secured thereto, via mounting bolts 35 passing through mounting flange 33 of thrust bearing 31 and spaces or bossed areas 43 extending from mounting flange 104 of coupler housing 20.

Coupler shaft 30 passing through the center line of coupler housing 20 communicates with shaft 112 of the external drive means 110, via a flexible coupling 114, and communicates with pump shaft 52 via a splined coupling 50, whereby the external drive means 110 drives the pump shaft 52 without the drive means 110 being exposed to a harsh environment.

The circulating fluid 1, which serves to cool and lubricate circulating pump 4, shown broken away, enters conduit 8, also shown broken away, which is fitted with tee 14' to divert a portion thereof through conduit 16, which is equipped with solenoid valve 18, and another portion thereof through conduit 24. That portion of fluid 1 which has been diverted through conduit 16, continues through conduit 16', prior to entering a high precision double mechanical rotating seal 90, such as is disclosed in U.S. Pat. No. 3,972,536. A mounting flange 102 of the double mechanical rotating seal 90 is received by a mounting flange 104 of coupler housing 20 and secured by mounting bolts 37, shown in another figure. Fluid 1 continues its path through conduit 16' and enters threaded passageway 92 in mounting flange 102 and continues through passageway 94 in mounting flange 102, to chamber 22, shown in more detail in another figure. The double mechanical rotating seal 90 serves as a vacuum and a fluid chamber, whereby one seal face, in combination with the higher viscocity of fluid as compared to the viscocity of air, substantially prevents atmospheric air from entering into chamber 22, and whereby the other seal face in combination with the higher viscocity of fluid 1 as compared to the vacuum in chamber 28, substantially prevents the vacuum within chamber 22, located in double mechanical rotating seal 90, from entering chamber 28 during operating and static conditions.

Conduit 24 is threated into coupler housing 20 and that portion of fluid 1 which had been diverted into conduit 24 is impeded by restrictive orifice 26 shown mounted in coupler housing 20, prior to flowing into chamber 28.

Fluid 1 within chamber 22 of the double mechanical rotating seal 90, exits therefrom via passageway 98 and via threaded passageway 96 both of which are located in mounting flange 102, and passageway 96 receives conduit 44, which is equipped with solenoid valve 46. Fluid 1 flows through conduit 44 and conduit 44' which is threaded into coupler housing 20, and flow is there impeded by restrictive orifice 48, shown mounted in coupler housing 20 prior to fluid 1 flowing into chamber 42. Thereafter fluid 1 exits chamber 42 via circulating pump housing 5 through threaded conduit 56. Carbon bearing 40 mounted within an opening of interior wall 20b of coupler housing 20 serves a multiple function, by providing frictional engagement with coupler shaft 30 to help support and stabilize shaft 30, and by allowing a relatively small amount of fluid 1 to pass therethrough from chamber 28 to chamber 42.

Chamber 22 is defined by the specific double mechanical rotating seal 90, one of which is hereinafter described in greater detail and shown in another figure. Chamber 28 is defined by available space between the interior wall of coupler housing 20, the exterior surface of the double mechanical rotating seal 90, the mounting flange 102 of the double mechanical rotating seal 90 on one end, and one face of bearing 40 on the other end, less the volume of shaft 30. Chamber 42 is defined by available space between the interior wall of coupler housing 20, the mounting flange 20c, the other face of bearing 40 at one end, and the cavity formed by the juncture of mounting flange 20c and circulating pump housing 5 less the volumes of shaft 30 and of splined coupling 50, and pumpshaft 52.

The restrictive orifices 26 and 48 have diameters of sufficient size to produce the desired vacuums of different magnitudes and they have a combined diameter to allow sufficient flow of the circulating fluid 1 to maintain the needs of bearing 40 and circulating pump 4.

The solenoid valves 18 and 46 are in electrical communication with the circuitry of the external drive means 110, so that upon shutdown and under static conditions, the solenoid valves 18 and 46 are activated to close, thereby securing the vacuums and the fluid within chambers 28 and 42, to prevent any leakage of vacuum of less magnitude in chamber 22 into chambers 28 and 42, which maintain vacuums of higher magnitude, via conduits 16, 16' and 24 and via conduits 44 and 44' respectively.

Referring to FIG. 3 carbon bearing 40, shown mounted to interior wall 20b of coupler housing 20, broken away, is in frictional engagement with coupler shaft 30, and comprises a plurality of openings 41, of sufficient number and size, to facilitate the passage of fluid 1 from chamber 28 to chamber 42 during operating conditions.

Figures 4, 5:
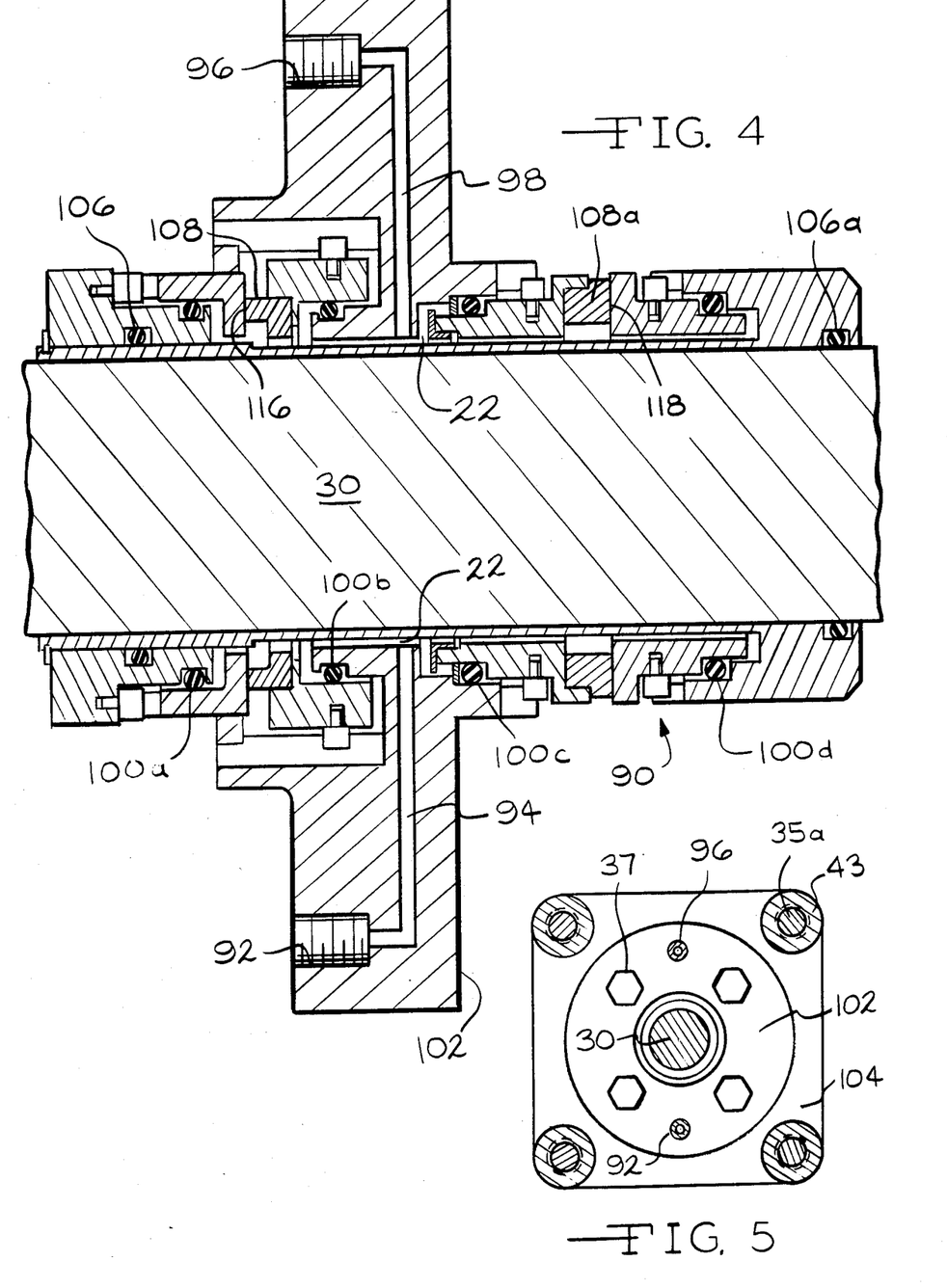
FIG. 4 is a sectional view along the center-line of a commercially available double mechanical rotating seal.
FIG. 5 is a sectional view along line 5—5 in FIG. 2.

Referring to FIG. 4, the double mechanical rotating seal 90, disclosed in U.S. Pat. No. 3,972,536, is shown mounted on coupler shaft 30, broken away at both ends. Chamber 22 is represented by a convoluted and tortuous passageway within the interior of the double mechanical rotating seal 90. Exterior O-rings 100a and 100d, define the outermost parameters of chamber 22 and interior O-rings 100b and 100c define the innermost parameters of chamber 22. The circulating fluid 1 enters mounting flange 102 of the double mechanical rotating seal 90, via threaded passageway 92, which receives conduit 16', shown in FIG. 2, and continues through passageway 94 to enter chamber 22, and exits from chamber 22 via passageway 98 and continues through threaded passageway 96, which receives conduit 44, shown in FIG. 2. Statis seals, O-rings, 1–6 on the atmospheric side, and 106a on the vacuum side are in a fixed engagement with shaft 30, and rotating seals 108 on the atmospheric side, and 108a on the vacuum side are in a rotating engagement with surfaces 116 and 118 respectively of the double mechanical rotating seal 90.

Referring to FIG. 5, the mounting flante 102 of the double mechanical rotating seal 90, shown in FIG. 4, is secured to mounting flange 104 of coupler housing 20, shown in FIG. 2, by mounting bolts 37 spacers or bossed areas 43 extending from mounting flange 104 are shown receiving mounting bolts 35a to secure thrust bearing 31 onto coupler housing 20. Coupler shaft 30 is shown along with threaded passageways 92 and 96, which receive conduits 16' and 44 respectively, shown in FIG. 2.

Figure 6:
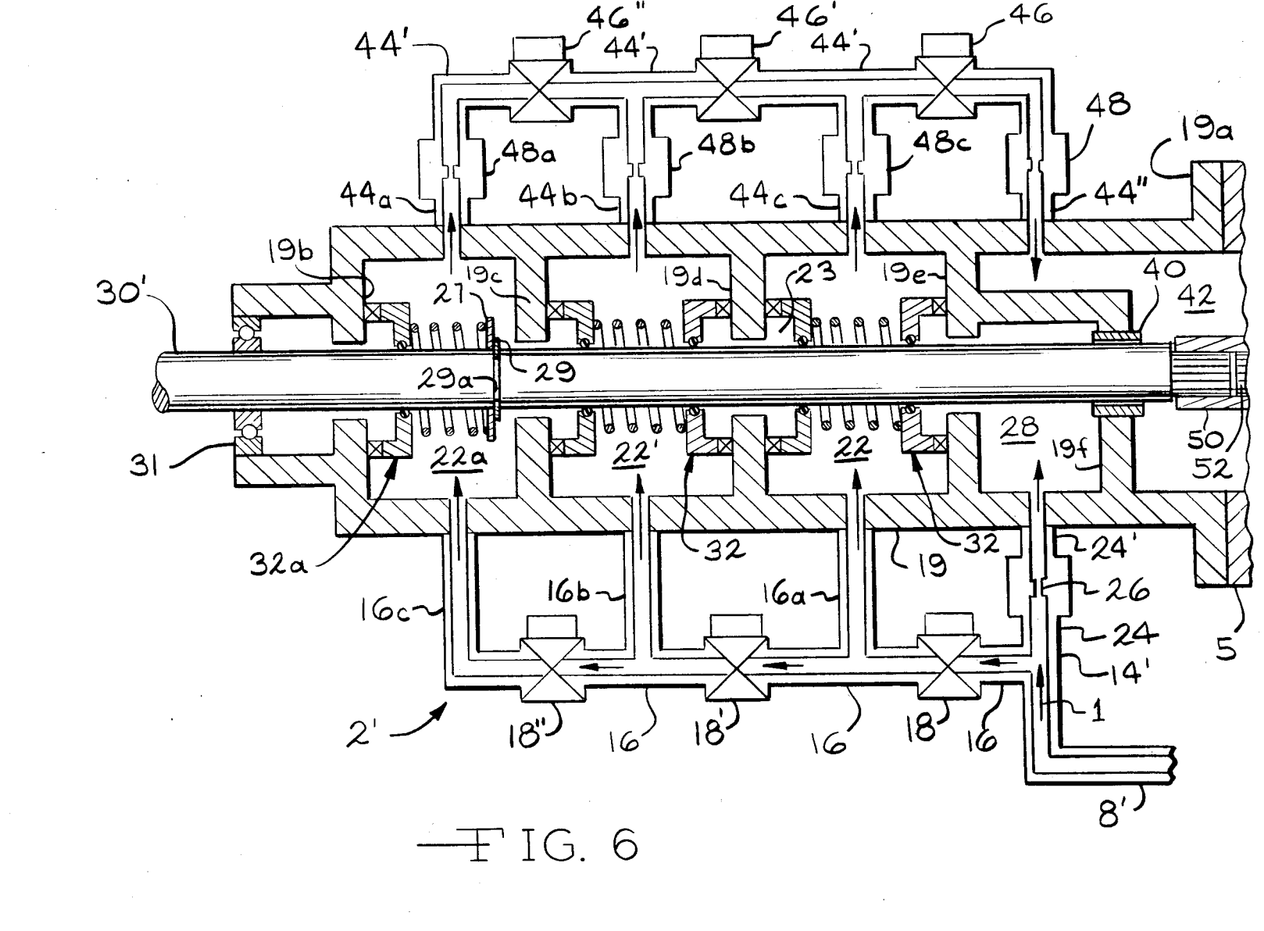
FIG. 6 is a schematic view of the invention, employing a plurality of double mechanical rotating seals interconnected in parallel.

Referring to FIG. 6, the flange 19a of coupler housing 19 of the coupler and manifold assembly 2' is schematically shown in communication with circulating pump housing 5 (broken away), wherein a plurality of chambers 22, 22' and 22a provided respectively by diagramatic double mechanical rotating seals 32, 32' and a diagramatic single mechanical rotating seal 32a, are shown interconnected in a parallel relationship.

Shaft 30', supported by thrust bearing 31 affixed to one end of coupler housing 19, communicates with an external drive means (not shown) at one end, and passes through a plurality of openings in internal walls 19c, 19d, 19e, 19f, the latter of which is mounted with a carbon bearing 40, to help support shaft 30' on the other end which communicates with pump shaft 52 via a splined coupling 50.

The double mechanical rotating seals 32, 32' are in communication with shaft 30', and are shown in a biased relationship with the respective surfaces of interior walls 19c, 19d, 19e, and the single mechanical rotating seal 32a is shown in a biased relationship with interior surface 19b of coupler housing 19 and secured to shaft 30' via flat washer 27 and shap ring 29 mounted within groove 29a.

The interconnection in a parallel relationship of chambers 22, 22' and 22a provides a means for further insuring that the desired vacuums are maintained against the incursion of atmospheric pressure into the system during operating and static conditions, especially the latter.

There is no theoretical limit upon the number of chambers which can interconnected in parallel or upon the combination of single and/or double mechanical rotating seals which may be employed within the scope of this invention.

The operation of the coupler and manifold assembly 2' is similar in function to that previously described in FIG. 1, except for additional chambers 22', 22a interconnected in parallel with chamber 22. Chamber 23 is a "stagnant" chamber, shown only as a result of the diagramatical representation of double mechanical rotating seals 32, 32', which in reality does not occur since fluid 1 is directed in and out of the cartridge-type seals.

A plurality of solenoid valves 18, 18', 18" and 46, 46', 46" are provided in combination with a plurality of restrictive orifices 26, 48, 48a, 48b, 48c, to function in combination with the plurality of chambers 22, 22', 22a, 28 and 42, of the coupler and manifold assembly 2'.

The flow pattern of fluid 1 after passing through conduit 8', is similar to that shown in FIG. 1 regarding chambers 22, 28, 42, and by independently activating paired solenoid valves 18'/46' and/or 18"/46", the flow of fluid 1 is the same as FIG. 1.

Fluid 1 is diverted by tee 14' to conduit 24 and to conduit 16, whereby the one portion which proceeds through conduit 24 flows through restrictive orifice 26 and conduit 24', prior to passing through coupler housing 19 to enter chamber 28, and the other portion which proceeds through conduit 16 flows through connecting conduit 16a, 16b and 16c prior to passing through coupler housing 19 to enter chambers 22, 22' and 22a respectively.

Fluid 1 continues its flow through coupler housing 19, conduit 44a, 44b, 44c and restrictive orifices 48a, 48b, 48c respectively to conduit 44', restrictive orifice 48 and conduit 44", prior to passing through coupler housing 19 to enter chamber 42. Paired solenoid valves 18/46, 18'/46', 18"/46" mounted on conduit 16 and 44' respectively are in electrical communication with the external drive means, whereby upon shut down and under static conditions, the said valves are activated to close, to secure the vacuums and the fluids within chambers 28, 42.

With the parallel interconnection of chambers 22', 22a with chamber 22 acting in concert with chambers 28, 42, seal leakage of atmospheric air into the system is further minimized over the use of chamber 22 in concert with chambers 28, 42, due to the vacuum being further "split" between chambers 28, 42 and atmospheric pressure.

Figure 7:
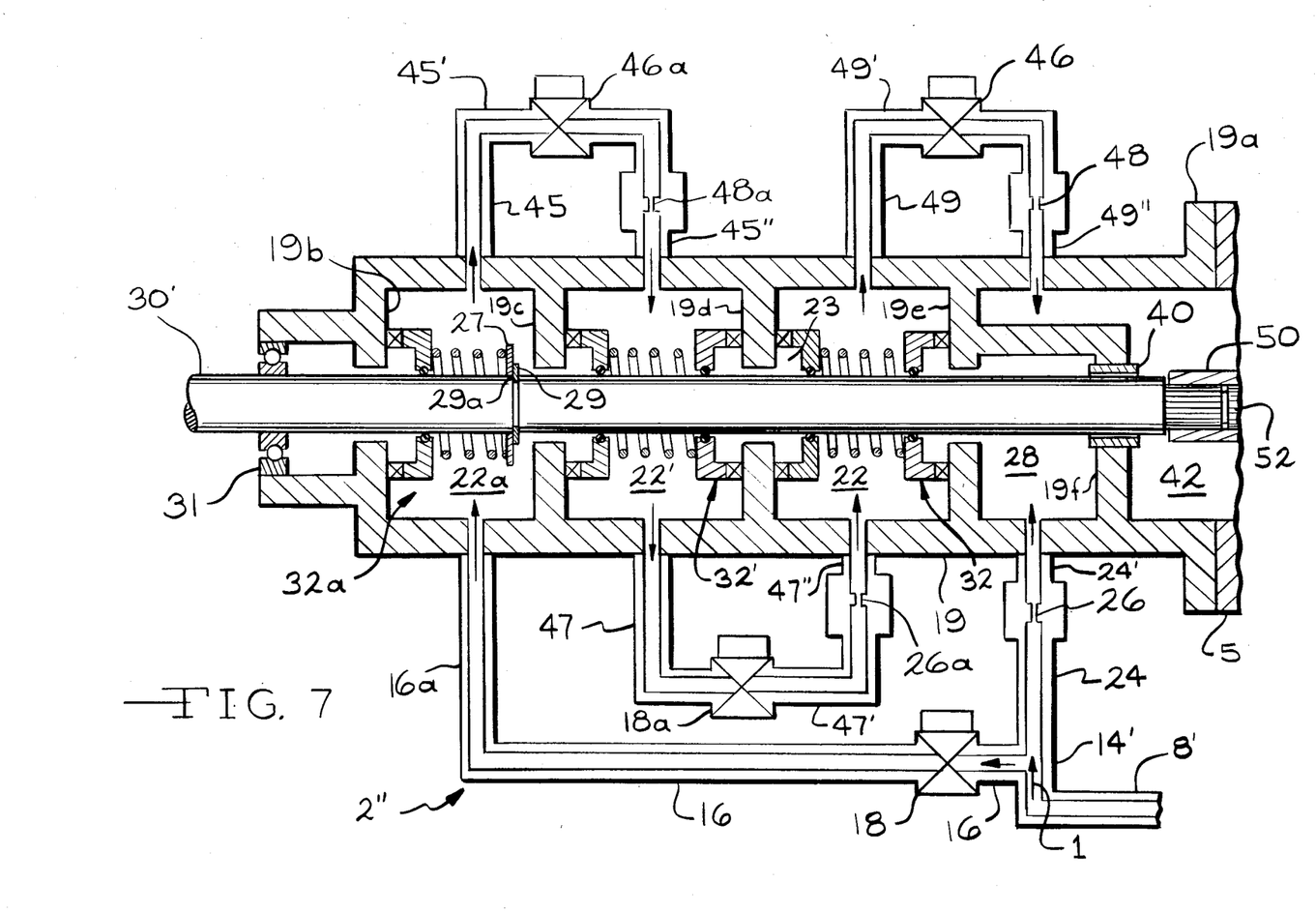
FIG. 7 is a schematic view of the invention employing a plurality of double mechanical rotating seals interconnected in series.

Referring to FIG. 7, the flange 19a of the coupler housing 19 of the coupler and manifold assembly 2" is schematically shown in communication with circulating pump housing 5 (broken away), wherein a plurality of chambers 22a, 22' and 22, provided respectively by diagramatic double mechanical rotating seals 32, 32' and a diagramatic single mechanical rotating seal 32a, are shown interconnected in a series relationship.

Shaft 30', supported by thrust bearing 31 affixed to one end of coupler housing 19, communicates with an external drive means (not shown) at one end, and passes through a plurality of openings in internal walls 19c, 19d, 19e, 19f, the latter of which is mounted with a carbon bearing 40, to help support shaft 30' on the other end which communicates with pump shaft 52 via a splined coupling 50.

The double mechanical rotating seals 32, 32' are in communication with shaft 30', and are shown in a biased relationship with the respective surface of interior walls 19c, 19d, 19e, and the single mechanical rotating seal 32a is shown in a biased relationship with interior surface 19b of coupler housing 19 and secured to shaft 30' via flat washer 27 and snap ring 29 mounted within groove 29a.

The interconnection in a service relationship of chambers 22a, 22' and 22, provides another means for further insuring that the desired vacuums are maintained against the incursion of atmospheric pressure into the system during operating and static conditions, especially the latter.

There is no theoretical limit on the number of chambers which can be interconnected in series or upon the combination of single and/or double mechanical rotating seals which may be employed within the scope of this invention.

The operation of the coupler and manifold assembly 2" is similar in function to that previously described in FIG. 1, except for additional chambers 22a, 22' interconnected in series with chamber 22. Chamber 23 is a "stagnant" chamber, shown only as a result of the diagramatical representation of double mechanical rotating seals 32, 32', which in reality does not occur since fluid 1 is directed in and out of the cartridge-type seals.

A plurality of solenoid valves 18, 18a, and 46, 46a, are provided in combination with a plurality of restrictive orifices 26, 26a, 48, 48a, to function in combination with the plurality of chambers 22, 22', 22a, 28 and 42, of the coupler and manifold assembly 2".

The flow pattern of fluid 1 after passing through conduit 8', is similar to that shown in FIG. 1 regarding chambers 28, 42, but the flow pattern of fluid 1 is modified herein to accommodate the series relationship of chambers 22a, 22' with chamber 22, prior to the flow in and out of chamber 22.

Fluid 1 is diverted by tee 14' to conduit 24 and to conduit 16, whereby the one portion which proceeds through conduit 24, flows through restrictive orifice 26 and conduit 24', prior to passing through coupler housing 19 to enter chamber 28, and the other portion which proceeds through conduit 16 advances through conduit 16', prior to passing through coupler housing 19 to enter chamber 22a.

Fluid 1 continues its flow through coupler housing 19, conduit 45, 45', restrictive orifices 48a and conduit 45" prior to passing through coupler housing 19 to enter chamber 22'. Thereafter, fluid 1 continues through coupler housing 19, conduit 47, 47', restrictive orifice 26a, and conduit 47", prior to passing through coupler housing 19 to enter chamber 22. Fluid 1 continues its flow through coupler housing 19, conduit 49, 49', restrictive orifice 48, and conduit 49", prior to passing through coupler housing 19 to enter chamber 42.

Solenoid valves 18 and 18a mounted on conduit 16 and 47' respectively and solenoid valves 46 and 46a mounted on conduit 45' and 49' respectively are in electrical communication with the external drive means, whereby upon shut down and under static conditions, the said valves are activated to close, to secure the vacuums and the fluids within chambers 28, 42.

With the series interconnection of chambers 22a, 22' with chamber 22 acting in concert with chambers 28, 42, seal leakage of atmospheria air into the system is further minimized over the use of chamber 22 in concert with chambers 28, 42, due to the vacuum being further "split" between chambers 28, 42 and atmospheric pressure.

Modifications of the disclosed device may be resorted to without departing from the spirit and scope of the appended claims.

What is claimed is:

1. A coupler and manifold assembly for use between an external drive means and a circulating pump for an absorption chiller, comprising in combination:
   (a) a sturdy housing comprising a plurality of chambers in communication with each other, wherein said chambers are capable of maintaining vacuums of equal or different magnitudes;
   (b) a shaft extending through said housing, being capable of rotating when its one end is connected to said external drive means, and said shaft being capable of engaging and rotating impellars of said circulating pump when connected to said circulating pump at its other end;
   (c) at least one double mechanical rotating seal mounted upon said shaft and positioned within said housing, whereby each said seal defines another chamber capable of maintaining its own vacuum against the entry of atmospheric pressure at one seal face and against the exit of its vacuum to one of said plurality of chambers at the other seal face;
   (d) at least one bearing engaging said shaft and mounted within an opening in at least one interior wall of said housing which separates said plurality of chambers within said housing; to provide support for said shaft and to allow communication between said plurality of chambers;
   (e) conduit to interconnect said plurality of chambers and to receive a fluid from the discharge side of said circulating pump, and to transport said fluid to said chamber defined by said seal and to said plurality of chambers within said housing, and to further transport said fluid back to the suction side of said circulating pump to complete a closed system;
   (f) a tee connected to said conduit to direct a larger proportion of said circulating fluid to said chamber defined by said seal;
   (g) a plurality of restrictive orifices positioned within said conduit to direct a smaller proportion of said circulating fluid leading to one of said plurality of chambers separated by said interior wall, and to provide restricted fluid flow from said chamber defined by said seal and to the other of said plurality of chambers separated by said interior wall; and
   (h) a plurality of solenoid valves, positioned within said conduit and in electrical communication with said external drive means, to help seal the said vacuums concommitantly with and during shut down of said circulating pump, whereby said coupler and manifold assembly provide a controlled and stabilized environment necessary for efficient operation of the absorption chiller, by inducing and maintaining differential vacuums across the said seal faces, under operating and static conditions, while providing lubrication and cooling to said circulating pump, and whereby said coupler and manifold assembly eliminate transfer of heat from said drive means to said absorption chiller, and eliminate destructive effects upon said external drive means by mechanical stress upon start-up and by abrasive and corrosive particulate contaminates circulating within said fluid during operation.

2. The claim as claimed in claim 1, wherein said plurality of chambers within said housing have vacuums of different magnitude than the vacuum within to said chamber defined by said double mechanical rotating seal, to enable said double mechanical seal to be employed with vacuums within said sturdy housing beyond its specifications, whereby one seal face of said double mechanical rotating seal separates said vacuums of different magnitude, and whereby the other seal face of said double mechanical rotating seal separates atmospheric air from said vacuum in said double mechanical rotating seal.

3. The claim as claimed in claim 2, wherein said chamber defined by said double mechanical rotating seal comprises a vacuum of approximately 15–16" Hg during operation and shut down, and said plurality of chambers within said housing comprises a vacuum of approximately 27.44" Hg during operation and a vacuum of approximately 29.65" Hg during shut down.

4. The claim as claimed in claim 1, wherein said bearing has a plurality of openings therein adjacent to said shaft, to lessen the restriction to flow of said fluid from one of said plurality of chambers to another of said plurality of chambers.

5. The claim as claimed in claim 4, wherein said bearing has two openings therein, to controllably lessen the said restriction of flow of said fluid from one of said plurality of chambers to another of said plurality of chambers.

6. The claim as claimed in claim 1 wherein one of said plurality of restrictive orifices is positioned in said conduit which is leading to one of said plurality of chambers, and wherein another of said plurality of restrictive orifices is positioned in said conduit which is leading from said chamber defined by said double mechanical rotating seal.

7. The claim as claimed in claim 1, wherein one of said plurality of restrictive orifices is located within said housing wall defining one of said plurality of chambers separated by said bearing, and wherein another of said plurality of restrictive orifices is located within said housing wall defining another of said plurality of chambers separated by said bearing.

8. The claim as claimed in claim 1, wherein said restrictive orifices have diameters sufficient to produce the said vacuums of different magnitudes, and wherein said restrictive orifices have a combined diameter to allow sufficient flow of said fluid to maintain the needs of said bearing and said circulating pump.

9. The claim as claimed in claim 1, wherein one of said plurality of solenoid valves is positioned in said conduit which is leading to said chamber defined by said double mechanical rotating seal, and wherein another of said plurality of solenoid valves is positioned in said conduit which is leading from said chamber defined by said double mechanical rotating seal, whereby upon shut down and under static conditions, said solenoid valves are closed to preserve the integrity of the vacuum in the system.

10. The claim as claimed in claim 1, wherein a plurality of said double mechanical rotating seals in combination with at least one single mechanical rotating seal are interconnected in a parallel relationship to help insure that the desired vacuums are maintained against the incursion of atmospheric pressure into the system during operating and upon shut down and static conditions.

11. The claim as claimed in claim 10, wherein a restrictive orifice is positioned in said conduit which is leading to each of said plurality of chambers defined by said housing, and wherein a restrictive orifice is positioned in said conduit which is leading from said chambers defined by said double mechanical rotating seals and from said chamber defined by said single mechanical rotating seal and by said housing.

12. The claim as claimed in claim 11, wherein paired solenoid valves are positioned in said conduit which is leading to and from each of said chambers defined by said plurality of double mechanical rotating seals and which is leading to and from said chambers defined by said single mechanical rotating seal and by said housing, whereby upon shut down and under static conditions said solenoid valves are closed to maintain the said vacuums and fluid within each chamber.

13. The claim as claimed in claim 1, wherein a plurality of said double mechanical rotating seals in combination with at least one single mechanical rotating seal are interconnected in a series relationship to help insure that the desired vacuums are maintained against the incursion of atmospheric pressure into the system during operating and upon shut down and static conditions.

14. The claim as claimed in claim 13, wherein a restrictive orifice is positioned in said conduit which is leading to each of said plurality of chambers defined by said housing, and wherein a restrictive orifice is positioned in said conduit which is leading from said chambers defined by said double mechanical rotating seals and from said chamber defined by said single mechanical rotating seal and by said housing.

15. The claim as claimed in claim 14, wherein each of said plurality of solenoid valves is positioned in said conduit which is leading to one of said plurality of chambers defined by said housing, and in said conduit which is leading to each of said chambers defined by said double mechanical rotating seals, and in said conduit which is leading to said chamber defined by said single mechanical rotating seal and by said housing, whereby upon shut down and under static conditions said solenoid valves are closed to maintain the said vacuums and fluid within each chamber.

* * * * *